United States Patent
Chu et al.

(10) Patent No.: US 8,483,192 B2
(45) Date of Patent: Jul. 9, 2013

(54) SIX-ADDRESS SCHEME FOR MULTIPLE HOP FORWARDING IN WIRELESS MESH NETWORKS

(75) Inventors: Liwen Chu, San Jose, CA (US); Kyeongsoo Kim, San Ramon, CA (US); George Vlantis, Sunnyvale, CA (US)

(73) Assignee: STMicroelectronics, Inc., Coppell, TX (US)

( * ) Notice: Subject to any disclaimer, the term of this patent is extended or adjusted under 35 U.S.C. 154(b) by 1533 days.

(21) Appl. No.: 11/771,937

(22) Filed: Jun. 29, 2007

(65) Prior Publication Data
US 2009/0003291 A1    Jan. 1, 2009

(51) Int. Cl.
*H04W 84/12* (2009.01)

(52) U.S. Cl.
USPC ........ 370/338; 370/328; 370/310; 455/422.1; 455/524; 455/525; 455/460

(58) Field of Classification Search
USPC ............... 370/338, 310, 328; 455/422.1, 460, 455/524, 525
See application file for complete search history.

(56) References Cited

U.S. PATENT DOCUMENTS

| | | | |
|---|---|---|---|
| 5,602,839 A | 2/1997 | Annapareddy et al. | |
| 5,940,396 A | 8/1999 | Rochberger | |
| 6,771,617 B1 * | 8/2004 | Fielding | 370/321 |
| 7,269,406 B2 * | 9/2007 | Qi | 455/405 |
| 2006/0056457 A1 * | 3/2006 | Livet et al. | 370/475 |
| 2006/0256769 A1 | 11/2006 | Cho et al. | |
| 2006/0268715 A1 | 11/2006 | Zuniga et al. | |
| 2007/0104199 A1 * | 5/2007 | Taha | 370/392 |
| 2007/0263559 A1 * | 11/2007 | Gossain et al. | 370/328 |
| 2008/0062984 A1 | 3/2008 | Emeott et al. | |
| 2008/0240078 A1 | 10/2008 | Kruys et al. | |
| 2008/0310342 A1 * | 12/2008 | Kruys et al. | 370/328 |
| 2009/0003291 A1 | 1/2009 | Chu et al. | |

* cited by examiner

*Primary Examiner* — Lester Kincaid
*Assistant Examiner* — Diego Herrera
(74) *Attorney, Agent, or Firm* — Hogan Lovells US LLP

(57) ABSTRACT

A six field address scheme identifies both the originating point and the endpoint of a data frame enabling multiple hop forwarding through a plurality of intermediate mesh points in a wireless mesh network. Data frames originating or ending at a point outside of the wireless mesh network access the wireless network at a mesh access point using a legacy address scheme. The legacy address schemes are converted to a six address scheme using a proxy address table at the access point. Each mesh access point includes not only a routing table but a proxy address table as well as enabling the mesh access point, and/or mesh portal points, to convert address schemes having less than six address fields to the six field format. Subsequent to the conversion, mesh points within the wireless mesh network need only the routing table to facilitate the forwarding of the data frame.

26 Claims, 9 Drawing Sheets

SIX-ADDRESS SCHEME FOR MULTIPLE HOP FORWARDING IN WIRELESS MESH NETWORKS

BACKGROUND OF THE INVENTION

1. Field of the Invention

Embodiments of the present invention relate, in general, to forwarding data frames in a wireless network and particularly to a six field address scheme for multiple hop forwarding of data frames in a wireless mesh network.

2. Relevant Background

An increasing number of people today depend on the ability to connect to wireless networks in a variety of situations. While one-hop access points were a suitable solution in the beginning, they suffer from problems such as low coverage area and being overloaded. One solution to this dilemma is the use of wireless mesh networks ("WMN").

Mesh networking is a way to route data, voice, video, and instructions between the nodes of the network. It allows for continuous connections and reconfiguration around broken or blocked paths by "hopping" from node to node until the destination is reached. Mesh networks differ from other networks in that the component parts can all connect to each other via multiple hops, and they generally are not mobile. Thus each node in a mesh network can communicate with other nodes in its immediate neighborhood.

Whereas the Internet is mostly a wire-based, co-operative electronic communication infrastructure similar to the international postal agreement, in that messages are mutually delivered and relayed within their separate domains free of charge (i.e. if you relay my messages within your domain I'll relay your messages within mine), a mesh is a wireless co-operative communication infrastructure between a massive amount of individual wireless transceivers (i.e. a wireless mesh) that have Ethernet-type capabilities.

This type of infrastructure is decentralized (with no central server) providing a relatively inexpensive, very reliable, and resilient system as each node need only transmit as far as the next node. Nodes act as repeaters to transmit data from nearby nodes to peers that would otherwise be too far away to reach, resulting in a network that can span large distances without wired cable in between, especially over rough or difficult terrain. Mesh networks are also extremely reliable, as each node is connected to several other nodes. When one node drops out of the network, due to hardware failure or any other reason, its neighbors simply find another route. Extra capacity can be installed by simply adding more nodes. The network solutions involving mesh networks are as diverse as communications in difficult environments such as home networks, office networks, public access networks, emergency situations, tunnels and oil rigs to battlefield surveillance and high speed mobile video applications on board public transport or real time racing car telemetry.

Mesh networking operates on a principle similar to the way packets travel around the wired Internet—data will hop from one device to another until it reaches a given destination. Dynamic routing capabilities included in each device within the network allow this to happen. To implement such dynamic routing capabilities, each device needs to communicate its routing information to every device it connects with, "almost in real time". Each device then determines what to do with the data it receives—either pass it on to the next device or keep it. Obviously each node within the network must have a unique identity called a network address to facilitate peer-to-peer communication among the nodes. Due to the irregular and spontaneous nature of IP mesh network topology the address assignment becomes a non-trivial issue. To address this issue each mesh point in a 802.11 mesh networks use a media access control ("MAC") address allocated by the manufacture of the device.

The Institute of Electrical and Electronic Engineers ("IEEE") 802.11 standard identifies services that must be provided by a distribution system. A distribution system, be it wireless or wired, is the fundamental part of a network as it is the mechanism by which one access point communicates with another to exchange frames, forward frames to follow mobile stations from one location to another, and to exchange frames with wired networks.

To better understand the present invention, consider a typical wireless network as is known in the prior art and shown in FIG. 1. In this simplified depiction of a wireless network 100, the external network 110 is coupled to a gateway or portal 120 via a wired infrastructure 115. The portal 120 may be an Ethernet bridge and not only serve the role as a portal to the external network 110 but also as an access point for the wireless network 100. This simplified example of a wireless network 100 is a typical Basic Service Set ("BSS") in 802.11 networks. In such a wireless network several stations are associated with an access point or portal. The access point connects the wireless network with a wired network and normally relays frames among the stations with which it is associated. In this example, the network 100 includes three nodes, a laptop 130, a desktop 140 and a printer 150. Normally, each communicates wirelessly with portal 120 via a single hop in the network. Thus, when a print command is generated from either the laptop 130 or the desktop 140, it normally travels to the printer 150 via the portal/router 120.

FIG. 2 is a depiction of a multiple-hop distribution system ("DS") 200 (mesh network) as is known in the prior art. The DS 200 shown is comprised of three nodes or mesh points ("MPs") 220, 230, 240, 250, 260. In a mesh network, a mesh point is a computer with a network interface card ("NIC") or a handheld computer or similar device with access to the network. The uppermost MP 220 is in this depiction coupled to an external network 110 via a wired infrastructure 115. This uppermost MP 220 also serves as a mesh point portal ("MPP") for the remaining MPs 230, 240. Each mesh point in the DS 200 is coupled to each other via a single hop. Two MPs 230, 240 shown in FIG. 1 are each coupled to a mesh access point ("MAP") 250, 260. The two MAPs 250, 260 are each connected to two stations ("STA") 270, 280. Generally, any entity that has station functionality and provides access to the distribution services via the wireless medium for associated stations ("STAs") is an access point. MAPs are part of a mesh network as they are an independent MP with access point functionality that is not coupled with the MP. Furthermore each MAP has routing functionality. Please be notice that 4-address format of 802.11 with the help of default routing to the root of the wireless mesh network (wherein the root possesses a global proxy table) plus a local proxy table in each MP (outside of the root) can support frame forwarding in a multiple-hop mesh network.

As previously mentioned, each node or MP must have a unique network address and there must be a means by which to direct frames of data to the correct address. Based on a distribution system shown in FIG. 2, an address scheme was developed having four (4) fields. This four address format enables implementation of relay-type services in a multiple-hop wireless DS with the help of default routing to the root (having a global/local proxy table at the root and/or global/local proxy table in each MP). The root has a global proxy table for all STAs associated with MAPs (to map STAs to MAPs that they associate with) and all external nodes of MPPs (to map external nodes to MPPs). Each MP has local proxy table for all STAs associated with MAPs that are part of its subtree and all external nodes of MPPs which are part of its subtree. Each MAP has a local proxy table for all STAs associated with it to decide whether the received frames are from a STA with which it is associated.

In the four address format, the source address ("SA") and destination address ("DA") can be different from the receiver address ("RA") and transmitter address ("TA"). In the previous example each MP and STA possess a unique address and the root (MPP) maintains a global mapping table for all of the STAs associated with MAPs registered in the mesh network. This mapping table maps each STA to its associated MAP. It also maps each external node to a MPP which can forward frames to it. In tree-based routing, the root also maintains a routing table for each MP in the mesh network. Each MP maintains a routing table for its child MP in its subtree. It also maintains a local proxy table for all STAs associated with MAPs which are part of its subtree and all external nodes of MPPs which are part of its subtree. In link-state routing which is not shown here, each MP maintains a routing table for each MP in the mesh network. It also maintains a global proxy table for all STAs associated with each MAP in the mesh network and all external nodes of each MPP in the mesh network. Each MP tries to find the next hop to the destination MP/proxy MP through its routing table. If the destination node is an external node of the mesh network, the proxy table is used to find the destination proxy MP of the destination external node. If a MP can not find route for these frames, the default route is used. This default route takes all frames to the root. At the root the next hop to the destination can always be determined since the root has the path information to all the MPs in the mesh network and each MAP is aware of any STA affiliated with that access point. We can easily find that proxy tables are maintained in each MP but this approach requires substantial allocation of memory and is difficult to maintain. Also the default routing will be used in the path to root which is not good.

FIG. 3 shows a four block addressing scheme for a frame of data under the 802.11 standard as is known in the prior art for transmitting frames from one wireless station to another wireless station traveling through the root. The address scheme 300 comprises four address blocks. Address block number one 310 identifies the receiver address and address block two 320 identifies the transmitter address of the data frames. Blocks three 330 and four 340 represent the different meaning of the data frames respectively when the data frames are transmitted from a STA to its associated AP, from its associated AP to a STA and in distribution networks. Blocks three 330 is the destination address and block four 340 is not applicable when the data frames are transmitted from a STA to its associated AP. Blocks three 330 is the source address and block four 340 is not applicable when the data frames are transmitted from its associated AP to a STA. Blocks three 330 is the destination address and block four 340 is the source address when the data frames are transmitted in distribution networks. Thus, in the example of a frame being sent from STA1 270 to STA2 280 via the root (MPP) 220, the final destination is STA2 280 and the originating station is STA 1 270.

Initially the immediate transmitter of the packet is STA1 270 and the receiver is MAP 1 250. Thus, the first iteration of the address scheme is as shown in block 350. Note that address block four is omitted. The STA to MAP connection is not part of the wireless distribution system thus the forth address in not applicable. After MAP1 250 receives the frame, it tries to find the destination STA2 in its BSS 285 or the routing table. Because MAP1 can not find STA2 in its BSS and the exact path for STA2, the default path to the root is used and the next hop to the root is MP1 which is the receiver address (RA). The addresses of block one 310 and block two 320 change from MAP1 and STA1 to MP1 and MAP1, respectively. Note that the destination address and source address in block three 330 and block four 340, respectively, reflect the ultimate destination and the original source. The address scheme is as shown in block 360. When MP1 230 receives frames for STA2 from MAP1, it does the same process as was done by MAP1 (see block 370) and finds that the next hop to the root is the root. Thus the MP1's read of the destination address STA2 is unrecognized causing the frame to be routed to the portal or root of the DS 200. When the root receives frames for STA2 from MP1, it finds the proxy MP of STA2 which is MAP2. Then the root finds the next hop of MAP2 which is MP2. The addresses of block one 310 and block two 320 thereafter change to MP2 and root, respectively (block 380). Again note that the destination address and source address in block three 330 and block four 340, respectively, reflect the ultimate destination and the original source. When MP2 receives frames for STA2 from the root, it finds the proxy MP of STA2 that is MAP2 (block 385). MP2 then finds the next hop of MAP2 which is MAP2. The addresses of block one 310 and block two 320 change to MAP2 and MP2, respectively. (Again the destination address and source address in block three 330 and block four 340, respectively, reflect the ultimate destination and the original source.) When MAP2 receives frames for STA2 from MP2, it finds that STA2 is one of its associated STA. Then MAP2 uses the address scheme from DS to STA. The addresses of block one 310 and block two 320 change to STA2 and MAP2, respectively. Finally, note that block three 330 is the original source address and block four 340 is omitted (block 390).

Significantly, the previous examples contemplate one possible method of multiple hop frame forwarding via 802.11 four address format, possessing a proxy address list in each MP and default routing. However, this four address scheme cannot efficiently support all cases of routing and forwarding in multi-hopping mesh networks, in other words, default routing must be used in the path from the source to the root if the source can not find a path for the destination in the routing table. Furthermore, traffic grooming ("TG") mesh networks, wherein frames from one STA associated with a MAP are delivered through multiple MPs to another STA associated with another MAP, is not efficiently supported, in other words, default routing and proxy table in each MP must be used.

SUMMARY OF THE INVENTION

Briefly stated, embodiments of the present invention involve an address scheme for multiple hop forwarding of data frames in a wireless mesh network. According to one exemplary embodiment of the present invention, a six field address scheme is used to identify both the originating point and the endpoint of a data frame and to enable multiple hop forwarding of the data frame through a plurality of intermediate MPs in a wireless mesh network. In one embodiment of the present invention, the data frame either originates or ends at a point outside of the wireless mesh network. The data frame accesses the wireless mesh network at a MAP or a MPP and subsequently travels through the wireless mesh network using the six field address scheme and routing tables found at each MP.

Legacy address schemes used to transport the data frame to and from the wireless mesh network at the mesh network interface are converted to the six address scheme using a proxy address table. In one embodiment of the present invention, this interface takes place at a MAP. Each MAP includes not only a routing table but a proxy address table as well. The proxy address table enables the MAP, and in other embodiments MPPs, to convert address schemes having less than six address fields to the six fields format. The proxy table enables the root to find the proxy destination MP. Subsequent to the conversion, MPs within the wireless mesh network need only the routing table which includes MPs as the routing destinations to facilitate the forwarding of the data frame. MPs outside of the root, MAPs and MPPs are not required to maintain a proxy address list for the entire network.

In another embodiment of the present invention, methods for multiple hop forwarding data frames throughout a wireless mesh network are described. According to one method, a data frame originating at either a MP within the network or a STA outside of the wireless mesh network is associated with a six field address scheme. Those data frames that originate at a MP within the wireless mesh network are associated with the six field address scheme upon creation. According to one embodiment of the present invention, one of the six address fields is associated each with the origination or beginning point of the data frame and the destination or endpoint of the data frame.

Those data frames that originate (or are destined) outside of the wireless mesh network, and are associated with legacy addressing schemes possessing less than six address fields, are converted to the six field address scheme of the present invention upon interfacing with the wireless mesh network. In one embodiment a legacy station outside of the wireless mesh network originates a data frame to be forwarded through the network. The station interfaces with the wireless mesh network via a MAP. At the MAP, the legacy address scheme is converted to the six address scheme using a proxy address table for the wireless mesh network. When one of the address schemes has been converted, the data frame is forwarded through the wireless mesh network via multiple hops and through multiple MPs. Significantly, the data frame is forwarded at each intermediate MP using only information contained within the six field address scheme and a routing table found at each MP. A proxy address table is not required at each intermediate MP.

Should the destination of the data frame be outside of the wireless mesh network, the six address scheme is converted to the appropriate legacy format at the interface between the legacy device/station and the wireless mesh network.

In another embodiment of the present invention the data frame arrives to or departs from the wireless mesh network via a MPP. A MPP interfaces the wireless mesh network with a wired network such as the 802 network. Using a proxy address table, addressing schemes outside of the six field scheme of the present invention are converted to the six field address scheme using a proxy address table. In another embodiment of the present invention, a data frame may exit the wireless mesh network via a MPP, travel via a wired network, and return to the wireless mesh network via a different MPP so as to arrive at the destination in the most efficient and resource effective manner.

The features and advantages described in this disclosure and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes and may not have been selected to delineate or circumscribe the inventive subject matter; resort to the claims being necessary to determine such inventive subject matter.

BRIEF DESCRIPTION OF THE DRAWINGS

The aforementioned and other features and objects of the present invention and the manner of attaining them will become more apparent and the invention itself will be best understood by reference to the following description of a preferred embodiment taken in conjunction with the accompanying drawings, wherein.

Figure 1:
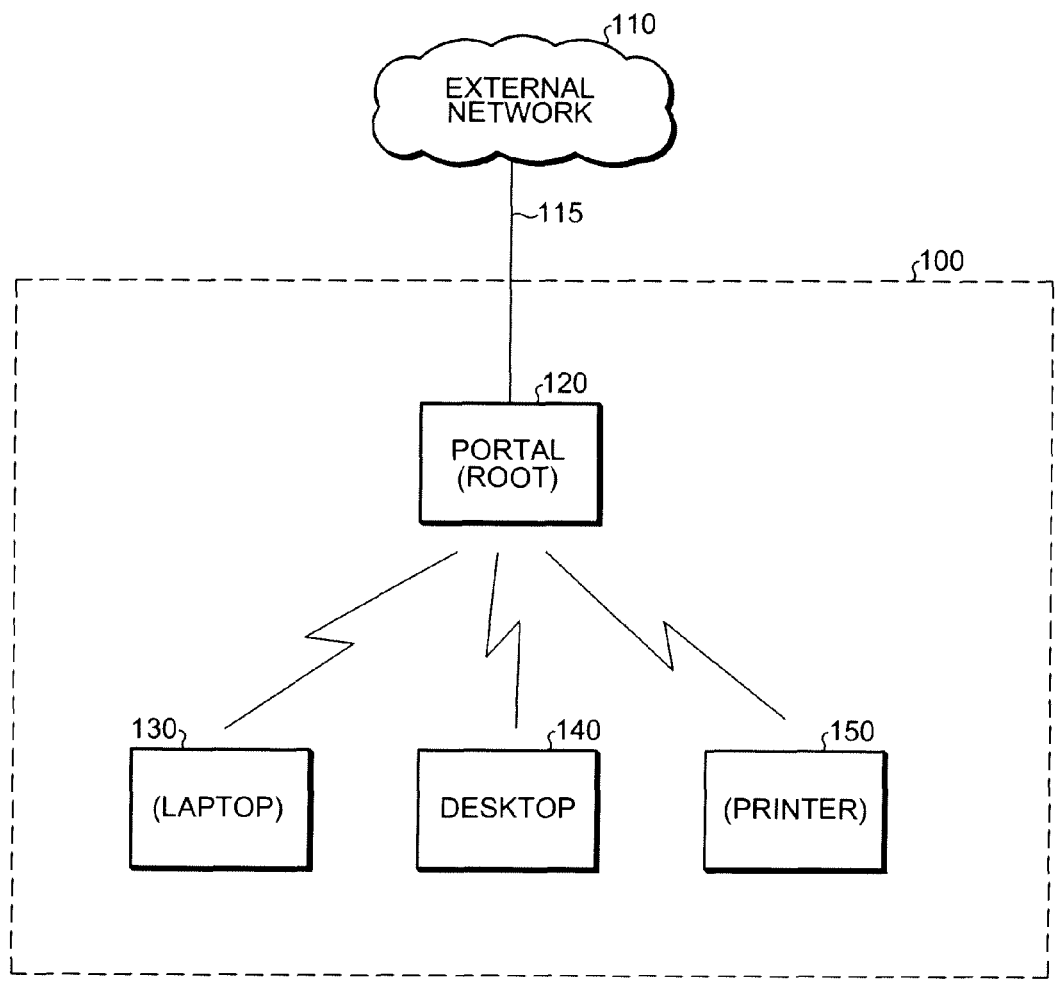
FIG. 1 shows a wireless networked computer environment as is known in the prior art.
Figure 2:
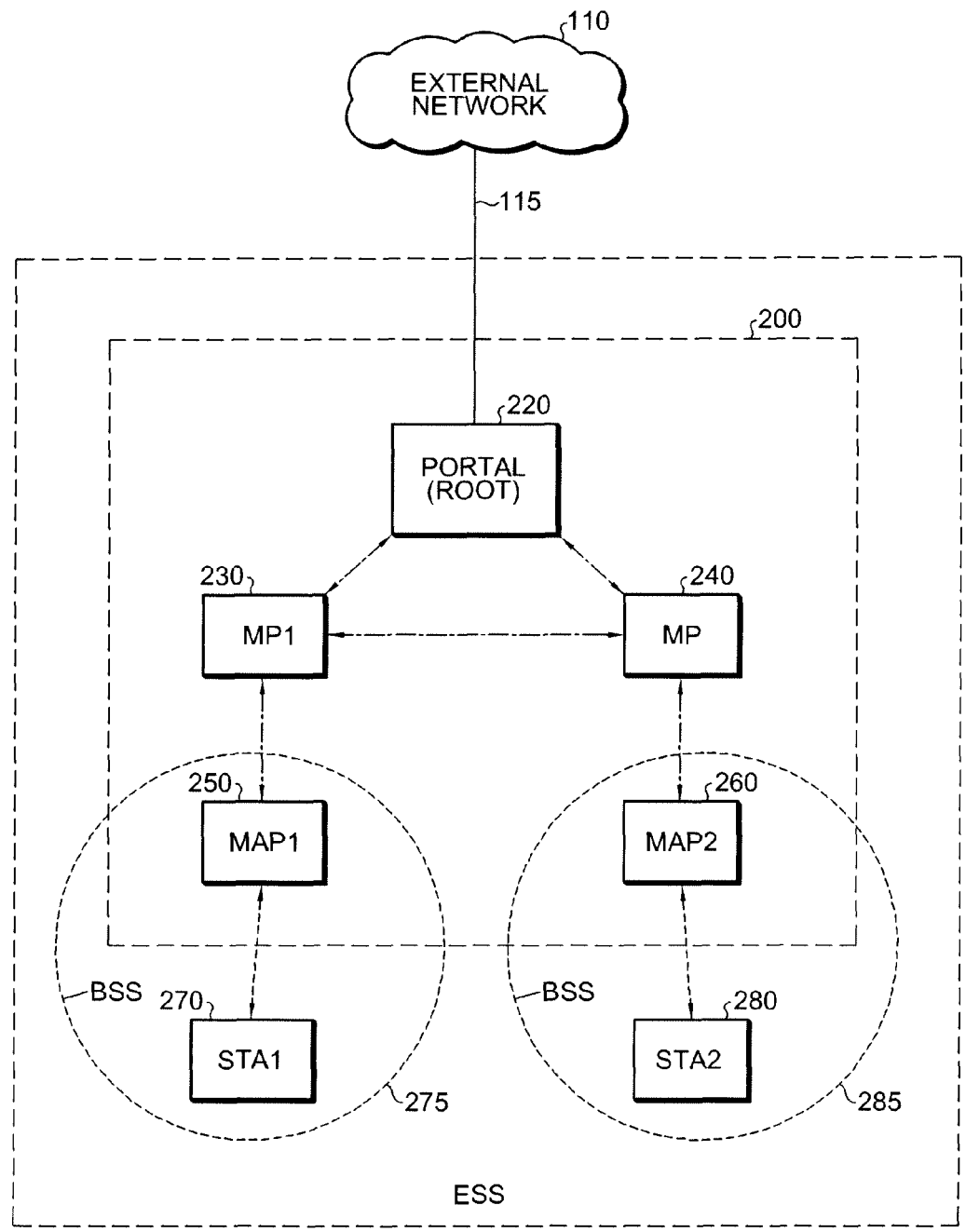
FIG. 2 shows a wireless mesh networked computer environment utilizing a four address scheme, proxy table and default routing as is known in the prior art.
Figure 3:
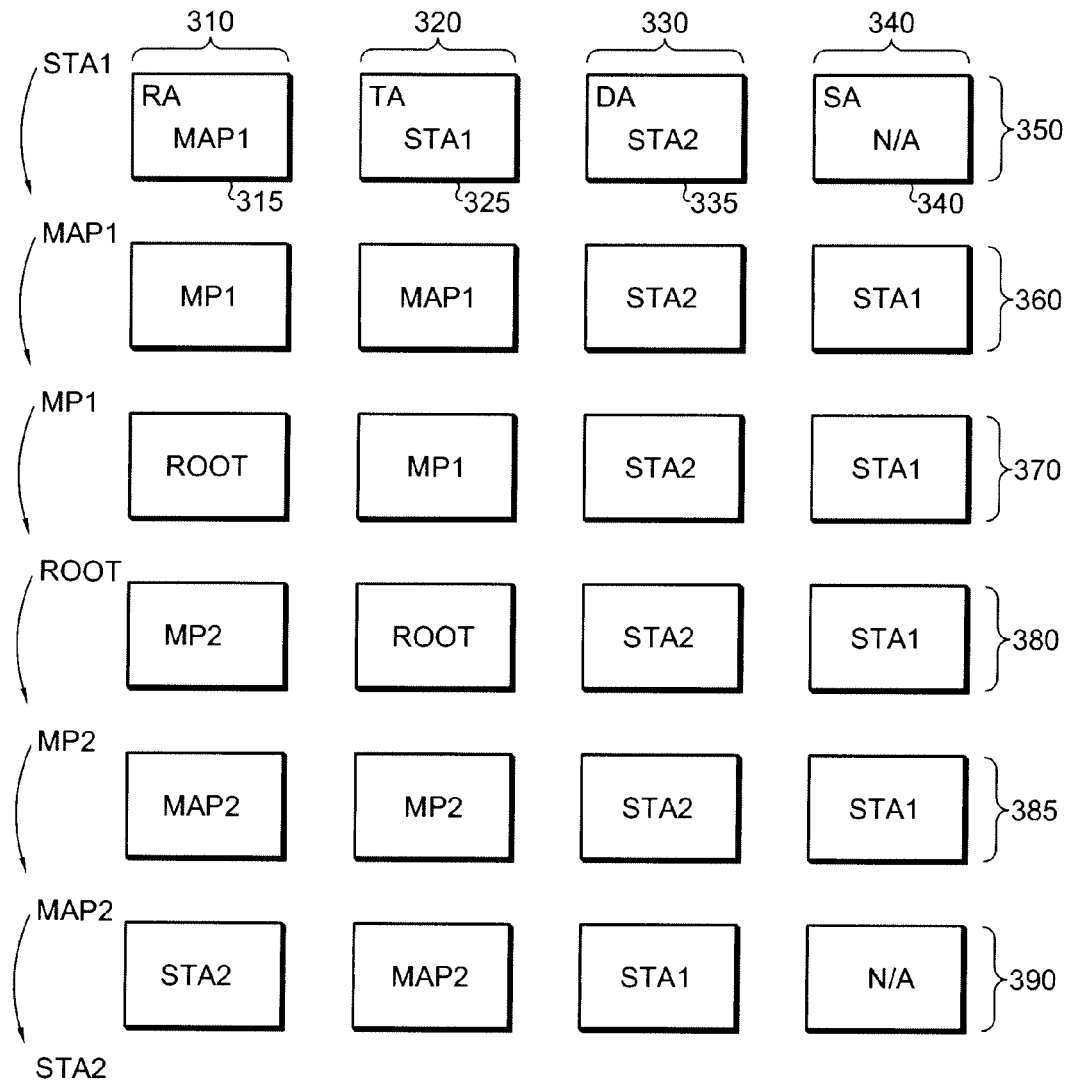
FIG. 3 is a four address scheme for the transfer of frames in a wireless distribution system for use with a proxy table and default routing as is known in the prior art.

The Figures depict embodiments of the present invention for purposes of illustration only. One skilled in the art will readily recognize from the following discussion that alternative embodiments of the structures and methods illustrated herein may be employed without departing from the principles of the invention described herein

DETAILED DESCRIPTION OF THE PREFERRED EMBODIMENTS

Specific embodiments of the present invention are hereafter described in detail with reference to the accompanying figures. Like elements in the various figures are identified by like reference numerals for consistency. Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention.

A six address scheme for multiple hop forwarding in wireless mesh networks is presented herein. According to one embodiment of the present invention, a six address scheme is used to direct frames of data from one location within a mesh network to another location within the mesh network via multiple hops without additional resource requirements being placed on nodes within the network to maintain a proxy address list or force the frame to be routed through a root directory. The significance of the present invention can be appreciated when considering the rapid interest in wireless computing and communication in the workplace or at educational institutions. In a mesh having multiple nodes (laptops or other mobile wireless devices) and a limited number of portals to the wired network or infrastructure relative to the number of wireless nodes, the ability for each wireless node to communicate and pass frames between themselves and to associated STAs is of a considerable advantage. As the number of wireless mesh nodes increase, the number of paths upon which a frame can travel increases and thus so does reliability of the mesh network. Consider, for example, the improvement in wireless communication in a cellular network if rather than each cell phone having to establish and maintain a link with a cellular tower, signal strength or the ability to communicate wirelessly is based on other cellular phones or nodes within a certain range. Those phones can link to other phones which eventually lead to a portal to the wired network. The present invention enables such an improvement.

Figure 4:
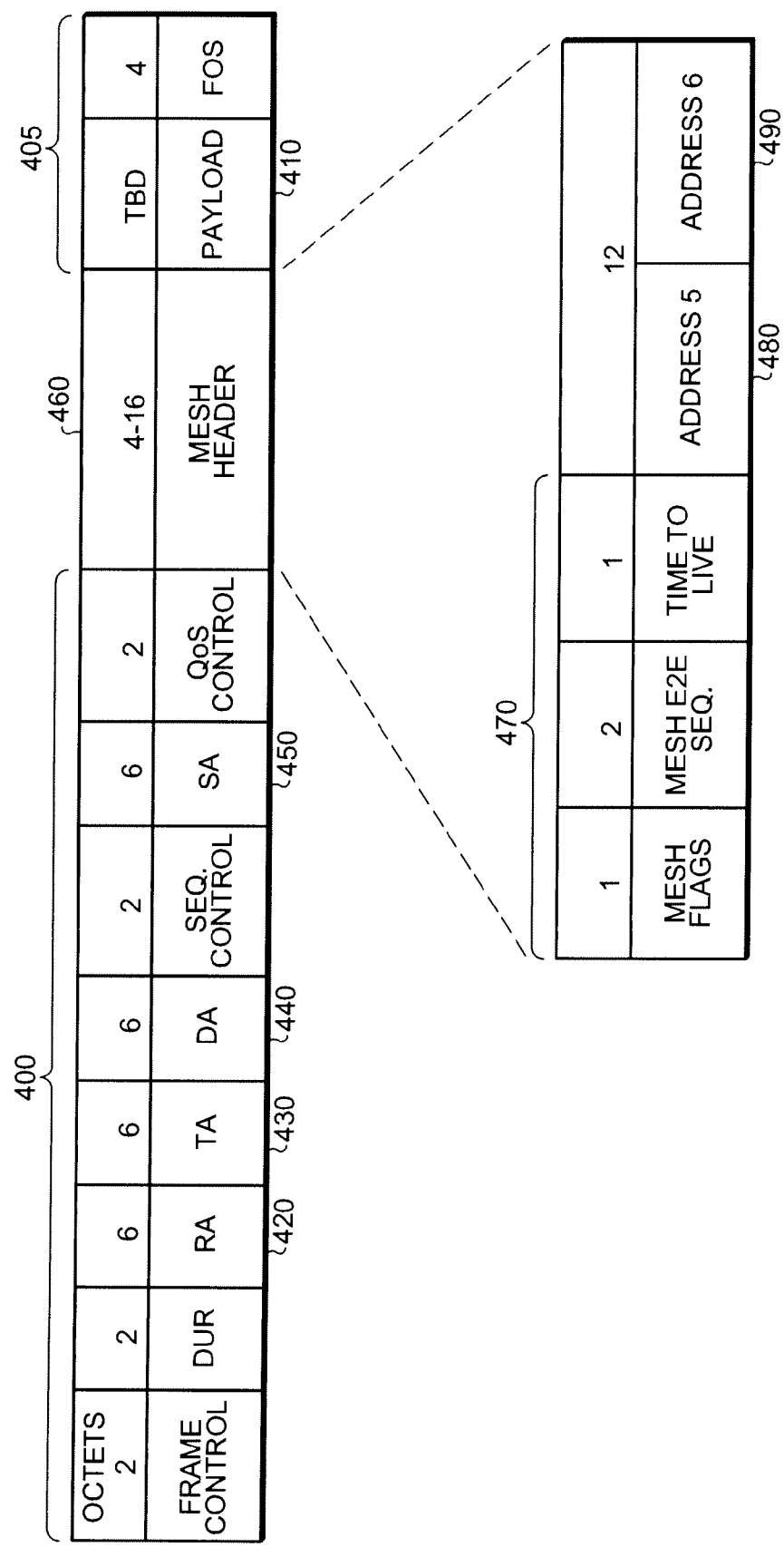
FIG. 4 shows one embodiment of a six address scheme for wireless mesh distribution systems according to the present invention showing an expansion of the mesh header possessing address field five and address field six.

FIG. 4 depicts a six address scheme for addressing frames in a wireless mesh network (distribution system) according to one embodiment of the present invention. As shown in FIG. 4, the four address scheme as known under the IEEE 802.11 standard is modified by adding an additional mesh header 460. As shown in FIG. 4, a new shim mesh header 460 is added between the current frame format 400 of the medium access control ("MAC") layer 400 and the logical link logic ("LLC") layer 405. Within the MAC layer 400, four address fields are used to direct the payload 410. These address fields include the receiver address ("RA") 420, the transmitter address ("TA") 430, the destination address ("DA") 440 and the source address ("SA") 450.

According to one embodiment of the present invention, a new mesh header 460 is added to the frame format existing under 802.11. This new mesh header 460 includes the standard fields 470 typically associated with a mesh header such as mesh flags, mesh sequencing, and a duration limitation (time to live) for the frame as well as two additional address fields 480, 490.

Figure 5:
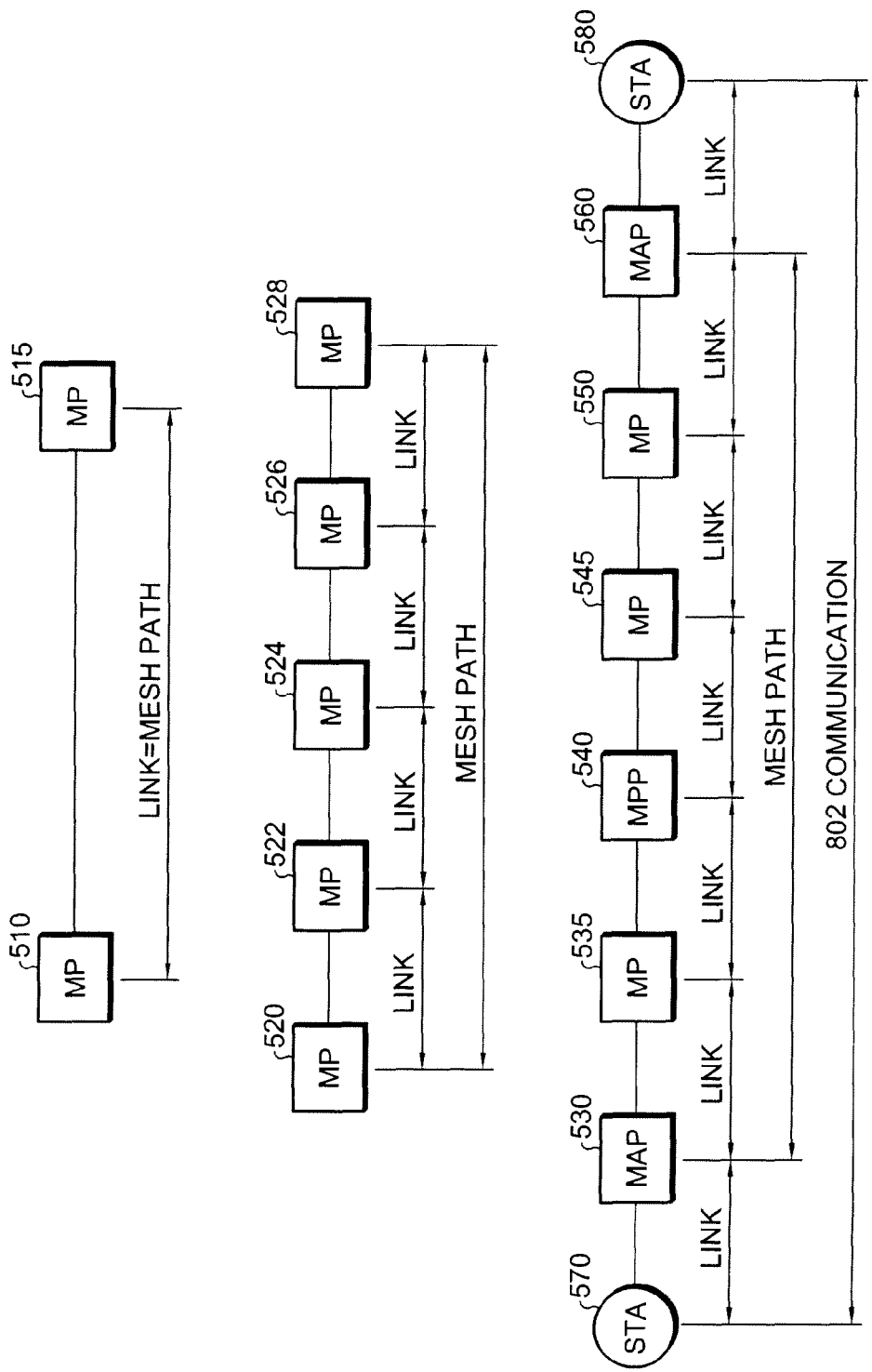
FIG. 5 is a linear representation of frame transfer in a mesh network distinguishing a MP to mesh point link, a mesh path and one embodiment of an 802 communication according to the present invention.

With additional reference to FIG. 5, showing one embodiment of a wireless distribution system utilizing a six address scheme according to the present invention, the usefulness of the additional address fields 480, 490 can be understood. The addition of address fields five and six expand the otherwise limited 802.11 address scheme. Address fields one and two, the RA 420 and the TA 430 represent endpoints of a link between a transmitting location, a first MP 510 and a receiving location, a second MP 515. Thus, a single hop network can function using just these two fields. In this case the link is the mesh path. Address fields three and four, the DA 440 and the SA 450, represent end points of a mesh path between a destination and a source mesh point including multiple mesh points 520, 522, 524, 526, 528 or MPPs. In this scenario the combination of multiple links is the MP.

The addition of address fields five and six expand the address scheme further by representing endpoints of an end-to-end communication. Communication does not typically terminate at a MP or at a MAP but at a STA including nodes outside of the wireless distribution system. Thus fields five and six enable the address scheme to efficiently and effectively direct frames between legacy stations (end points), between one or more MPs connected by MPPs 540, MAPs 530, 560, MPs 535, 545, 550, or STAs 570, 580 or any mixture of STAs, MPs, MPPs or MAPs. Here the 802 communication is a combination of the MP(s) and the links to the STAs. This communication is enabled by one or more embodiments of the present invention. In another embodiment of the present invention two distinct mesh paths being used using address field five and address field six. The first path is from the source MP to the root MP, and the second path is from the root MP to the destination MP. When the frames are forwarding to the root through default path, the root address is put in address field three, so the final destination is in address field five. When the frames are forwarding to the final destination/destination proxy, the root address is put in address field four, so the initiating source is in address field six.

Figure 6:
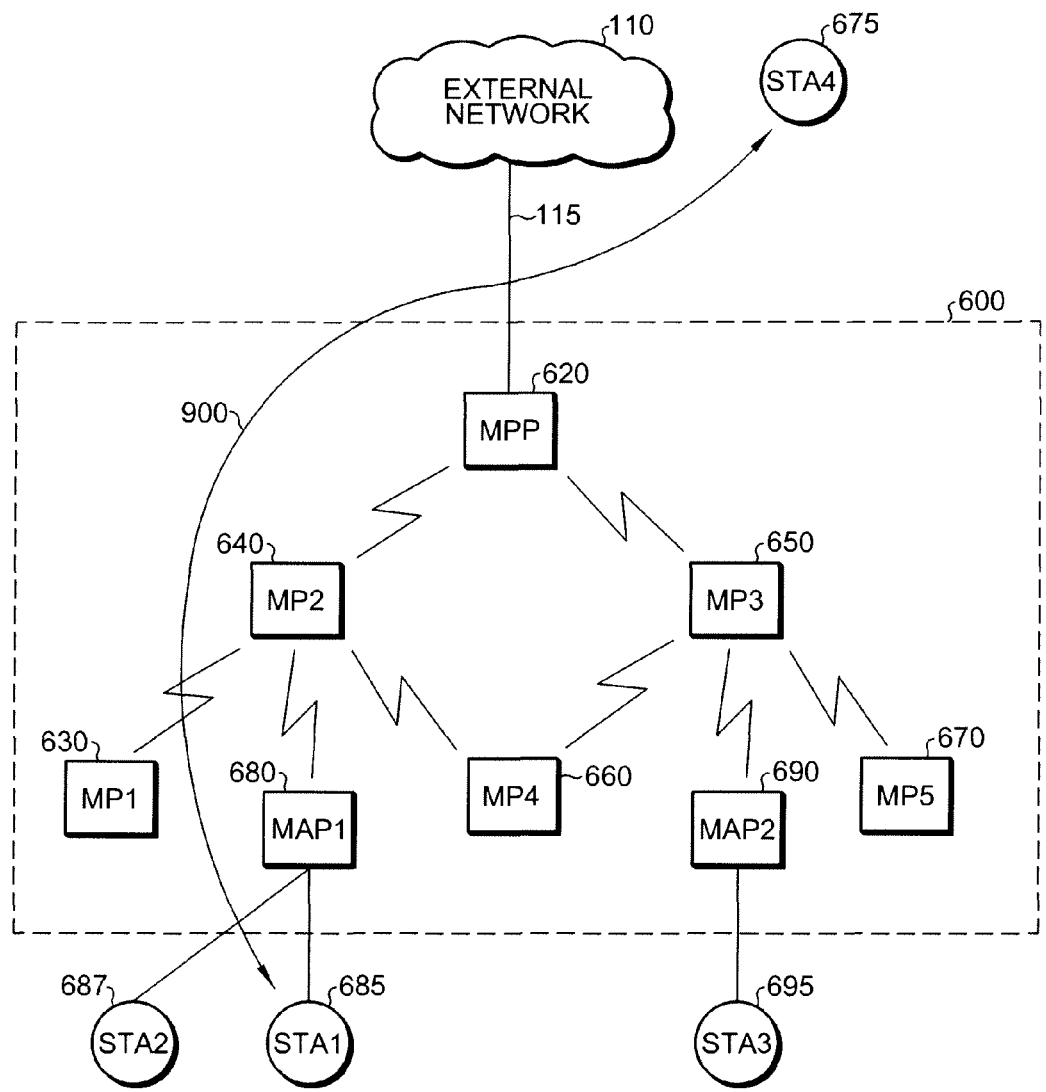
FIG. 6 depicts one example of a mesh networked, wireless distribution system, computer environment utilizing one embodiment of the present invention to direct frames from one destination to another as well as communicating to a STA located outside of the mesh network.

FIG. 6 shows one example of a wireless distribution system in a meshed network configuration with frame mesh paths facilitated by use of one embodiment of a six field address scheme according to the present invention. As shown in FIG. 6, the external network 110 is coupled via a wired infrastructure 115 to a MPP 620. The MPP 620 serves as a gateway from the wireless mesh network 600 to the external network 110.

Within the wireless mesh network 600 exists a plurality of nodes. These nodes can include MPs 630, 640, 650, 660, 670, MPPs 620, and/or MAPs 680, 690. Each MAP 680, 690 may be associated with one or more STAs 685, 687, 695 (legacy stations). A legacy station is a STA that does not possess the capability of directly participating in a mesh network yet can access the network via a MAP 680, 690. Also shown in FIG. 6 is a STA 4 675 not affiliated with the wireless mesh network 600. While in the FIG. 6 STA 4 675 is shown as being coupled to the external network 110 via a wired interconnect, STA 4 can represent another wireless distribution system or indeed another wireless mesh network with its own stations.

Figure 7:
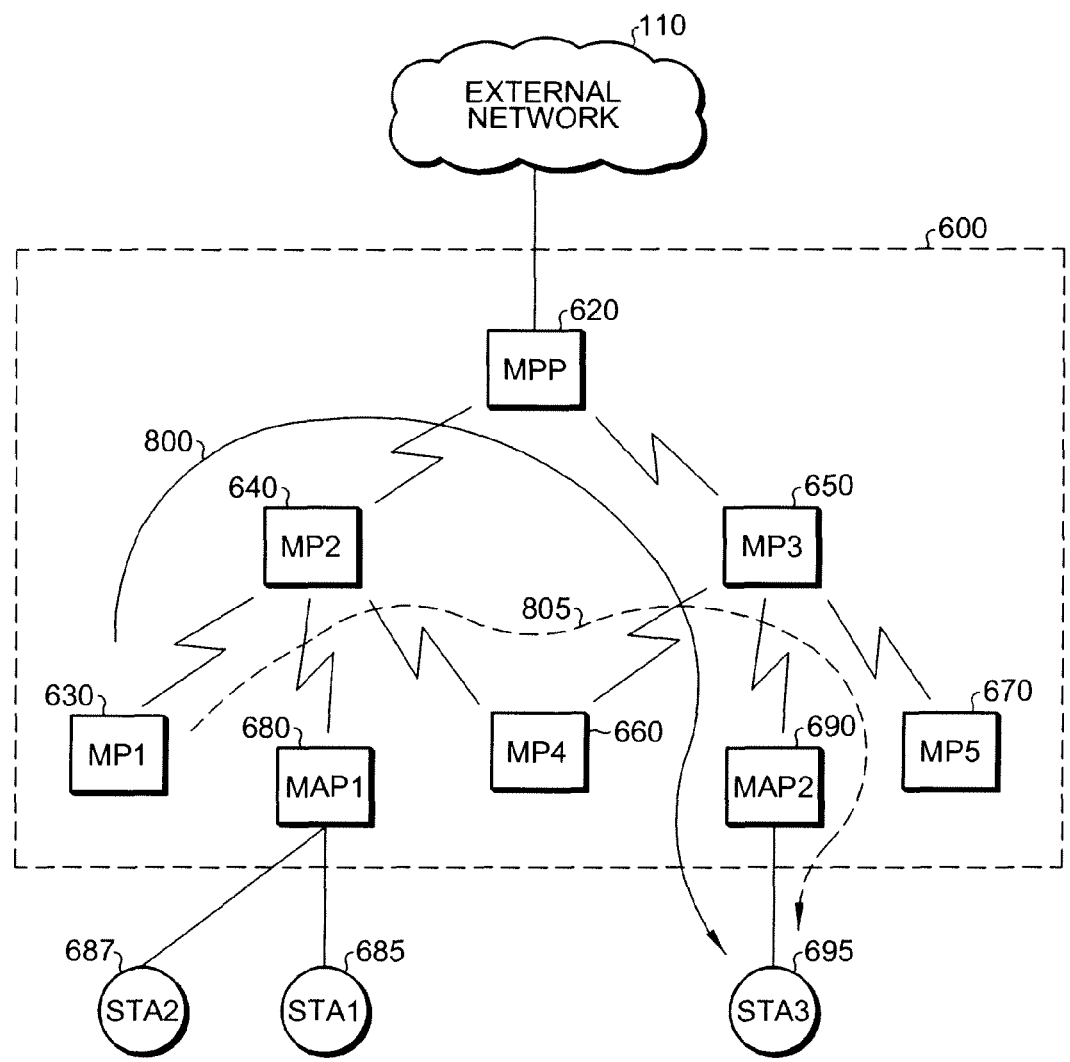
FIG. 7 is an expanded version of the wireless mesh network of FIG. 6 identifying multiple MPPs by which to forward a frame utilizing one embodiment of the six address scheme of the present invention.

The six field address scheme of the present invention enables frames to be communicated between any of the nodes in a wireless mesh network, or outside of that network, along multiple paths without using proxy tables and default routing in internal MPs. FIG. 7 is an expanded depiction of the wireless mesh network 600 of FIG. 6. FIG. 7 shows wireless and wired links between the various MPs of the wireless mesh network 600. For example, MP1 630 is wirelessly linked to MP2 640. MP2 640 is wirelessly linked to MPP 620, MP1 630, MP4 660, and MAP1 680. MAP1 680 is wirelessly linked to MP2 640 and linked to STA1 685 and STA2 687 via a wired connection.

The movement of frames within a wireless mesh network as shown in FIGS. 6 and 7 can generally follow one of three scenarios. Frames can flow from one STA to another. For example, a frame originating from STA1 685 can be directed toward STA3 695. A frame can also originate from a MP and be directed toward another MP or a STA. For example, a frame origination at MP1 630 can be directed to MP5 670. Finally, a frame can originate from the mesh network and be directed outside the network such as a frame starting at STA2 687 and ending at STA 4 675. In each scenario, multiple paths are possible.

The present invention fully supports and is compatible with Hybrid Wireless Mesh Protocol ("HWMP") and Radio Aware-Optimized Link State Routing ("RA-OLSR") protocol. With respect to both of these protocols it is important to understand maintenance of STA association information.

(Note: external node associations with MPPs in wired networks can be treated the same as wireless STAs) With respect to HWMP (HWMP includes on demand routing part (AODV) and proactive part (tree based routing)), each MAP/MPP locally maintains its STA association and responds to a route request message when any of the destination addresses match one of its associated STAs. For HWMP proactive tree-based routing, each MAP registers its associated STAs with the root and each MPP registers its associated external nodes with the root. In time based regulatory scenarios, the root maintains a global mapping table for all MPs and STAs in the wireless mesh network according to the registration information. With respect to RA-OLSR each MAP/MPP broadcasts its associated STAs to other MAPs/MPPs and each MAP/MPP maintains a global map for associating STAs to their associated MAPs. While the present invention is fully compatible with these aspects of the RA-OLSR and HWMP configurations, it alleviates many of the requirements in both protocols.

Fifth address field and sixth address field are used in the following case: 1) when the end points of IEEE 802 communication are non-mesh node/STA which communicate over a mesh via proxy MPs; 2) When the end point MPs communicating with each other via a root MP in HWMP proactive tree routing mode, where two distinct mesh paths are used (the first path from the source to the root MP and the second path being from the root MP to the destination MP). With HWMP proactive tree routing mode, if the source MP can not find the destination of a frame from its routing table or the frame is from one STA associated with it, it puts the destination and the source to fifth and sixth address field, the root to third address field, its address to fourth address field. When the root receives a 6-address frame, it tries to find the proxy of the destination (fifth address) from its proxy table or routing table. If the proxy is found and the root is not the proxy MP, third address field is replaced by the proxy address. Otherwise third address field is replaced by the fifth address field. With RA-OLSR, if the source MP finds the proxy destination of a frame from its proxy table or the frame is from one STA associated with it, it puts the destination and the source to fifth and sixth address field. If the source MP finds the destination of a frame from its proxy table, it puts the proxy MP's address to third address field, its address to fourth address field. Otherwise it puts destination address to third address field, its address to fourth address field. Since in 6 address scheme each MP can always find next hop for the destination MP/root MP from the routing table, the addition of a fifth and sixth address field representing the endpoint destination and the endpoint source respectively alleviate each MP's requirement to maintain a proxy table matching STAs/external nodes to their proxy MPs. While this is not the only solution to multiple hop forwarding in a wireless mesh network, it provides the significant advantage of minimizing additional resource overhead at each node within the network.

To fully understand the operational implementation of a six address field scheme consider the following examples of the present invention. Referring again to FIG. 7, one skilled in the art will recognize that multiple paths exist between many of the nodes within the wireless mesh network 600. In one embodiment of the present invention a frame originating at STA1 685 and directed toward STA 4 675, outside the wireless mesh network 600, can travel through the wireless mesh network 600 via MP2 640, MP4 660, MP3 650, or any combination thereof. Ultimately the frame must arrive at MPP 620 to exit the wireless mesh network 600 and travel to node4 675 via, in one embodiment, a 802 network.

Likewise a frame originating at MP1 630 and directed to STA3 695 never need leave the wireless mesh network 600 yet the path upon which the frame travels is one of several routes. FIG. 7 depicts two possible routes for such a movement of a frame of data. In the first route 800 the frame passes from MP1 630 to MP2 640 and then proceeds to the root (MPP 620) wherein it is directed to MP3 650, MAP2 690 and ultimately arrives at STA3 695. An alternate route 805 also passes through MP2 640 but instead of proceeding to the root (MPP 620) the frame is directed through MP4 660 and MP3 650 and MP5 670 before it arrives at MAP2 690 and thereafter STA3 695.

The determination of what path to follow rests on several criteria and is determined by routing protocol present and operating at each MP. These include but are not limited to bandwidth of the established links and the quality of the link between various MPs. According to one aspect of the present invention and with respect to the information carried by the frame within address field three (address field five may be used to find the destination MP using a proxy table), any and all available paths are equally capable of forwarding the frame to its ultimate destination. There is no need for the frame to pass through the root (MPP 620) although it may, should that path be the best suited route. Similarly the frame does not require each MP to possess knowledge of the association of STA3 695 with MAP2 690. That information is maintained within the frame itself.

Figure 8:
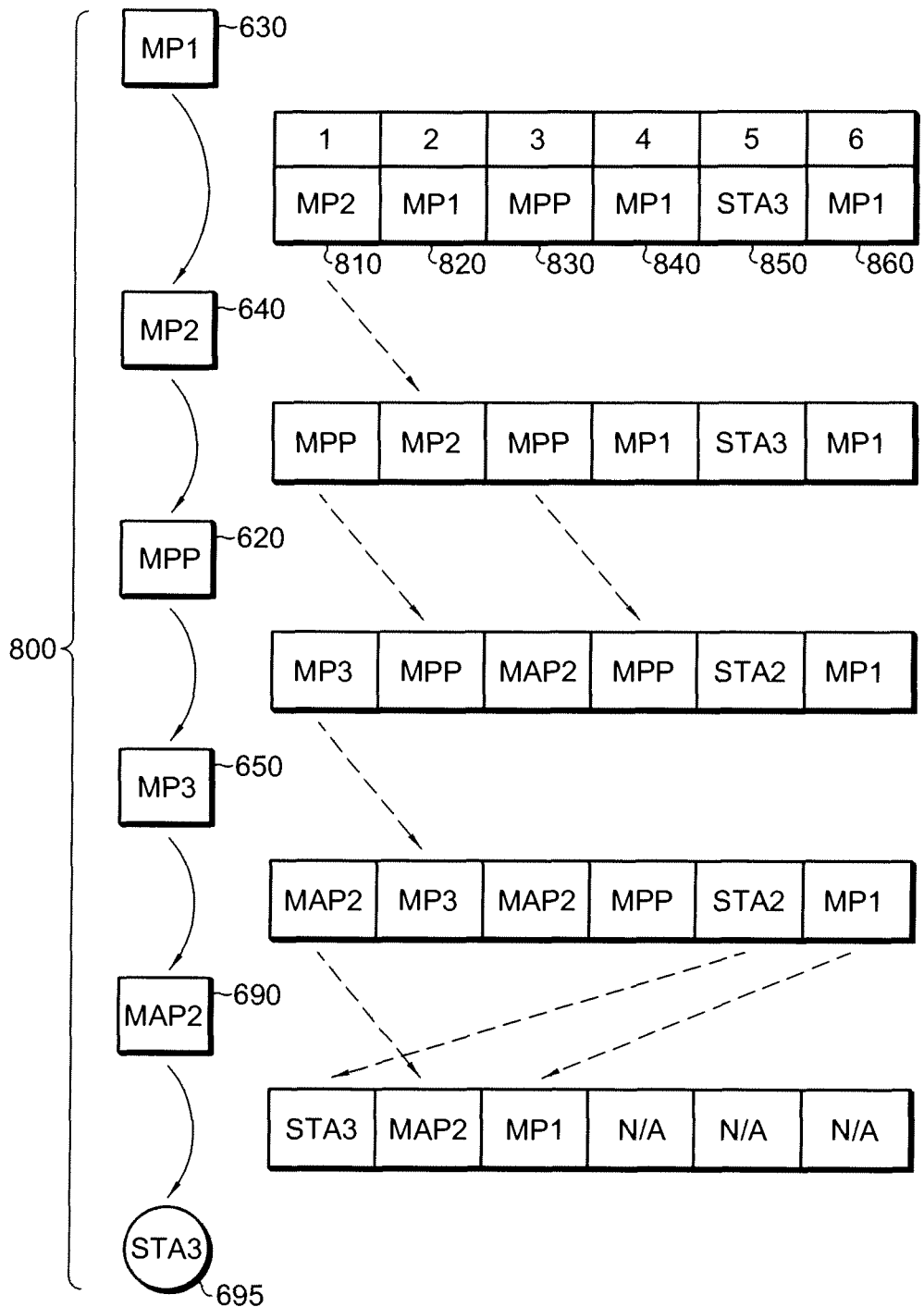
FIG. 8 is a tabular representation of a six field address scheme for multiple hop forwarding of a frame within in a wireless mesh network according to one embodiment of the present invention.
Figure 9:
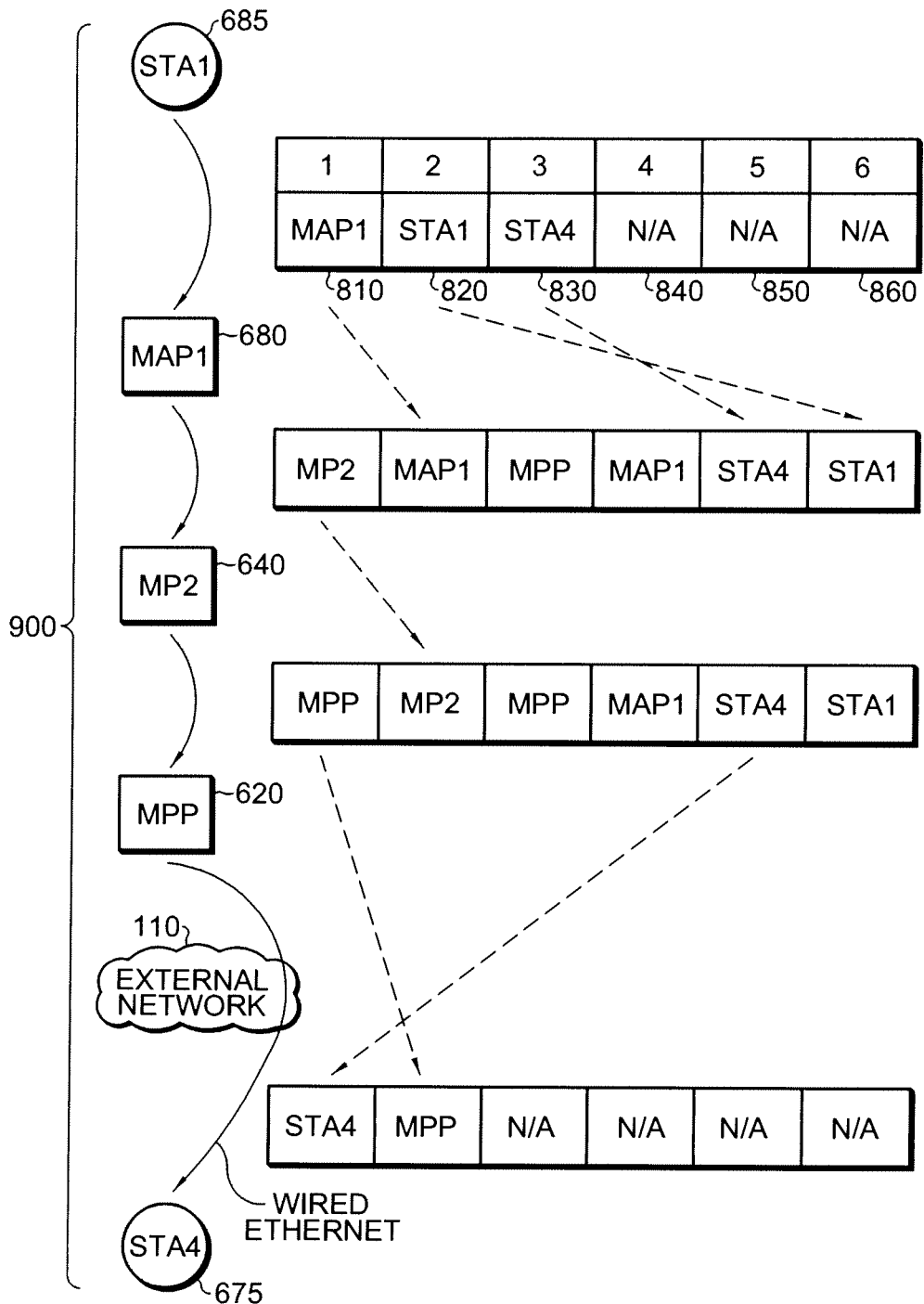
FIG. 9 is a tabular representation of a six field address scheme for multiple hop forwarding of a frame from a point within a wireless mesh network to a STA outside of the mesh network according to one embodiment of the present invention.

FIG. 8 depicts an illustration of the changing aspects of the six fields of the address scheme according to one embodiment of the present invention as a frame moves from its source to its destination along the first path 800 shown in FIG. 7. As the frame originates at MP1 630 the six fields of the address scheme identify not only that it is beginning its path from MP1 630 but that it is destined for STA3 695. In the first iteration of the address scheme the first field 810 reflects the RA of MP2 640 and the TA of MP1 630 is found in the second field 820. The third field 830 reflects the destination address in the mesh and is in this embodiment of the present invention, MPP 620 or the root of the wireless mesh network 600. The fourth field 840 reflects the mesh source address of MP1 630. The fifth address 850 indicates that the end point destination is STA3 695 and sixth address field 860 identifies the originating point that in this case is MP1 630.

Before the frame arrives at STA3 695 it will, in this embodiment, pass through four other nodes of the wireless mesh network. Accordingly the address scheme will be modified five times as is reflected in FIG. 8. Fields one 810 and two 820 consistently reflect the receiver address and the transmitter address for each hop. Field three 830 maps the destination as the root or the MPP 620. The root thereafter maps the frame to MAP2 690. Accordingly field three 830 indicates the destination address as MPP 620 for the first two hops and then MAP2 690 for the next two. The fourth address field 840 reflects that the frame originates from MP1 630. Significantly, field five 850 and field six 860 remain consistent throughout. Field five 850 indicates that the end point destination is STA3 695 and field six 860 indicates that the end point source is MP1 630. The transition between MAP2 690 and STA3 695 is based on the legacy address scheme for a frame from an AP to its associated STA. Thus fields four, five and six are not applicable. Field one 810, the RA, indicates STA3 695, field two 820, the TA, indicates MAP2 690, and field three, the source in this particular scheme, indicates MP1 630 as conveyed to it from address field six 860.

Note that during the frames transition through the MPs of the wireless mesh network 600, address fields five 850 and six 860, remain unchanged. While they convey end point source and destination information, these fields do not need to be processed with an exception that the root may find the proxy MP for the destination. Only data within the first four address fields needed to be dealt with inside the mesh. This greatly simplifies the forwarding process.

In this example of an application of one embodiment of the present invention, a tree-based routing in HWMP from MP1 630 to STA3 695 was used in which the root, MPP 620 was identified as the default route. The frame was forced to go through the root to arrive at the destination since the on-demand alternative routing path with better link quality has not been found. In another embodiment of the present invention the root is not identified as the default address and the MPP 620 simply acts as another MP within the wireless mesh network 600. In yet another embodiment of the present invention, link state routing using RA-OLSR is utilized. In such a case each MAP and MPP broadcast is associated STAs to other MAPs and MPPs. Accordingly each MAP and MPP maintains a mapping of the STAs to their associated MAP.

In another exemplary embodiment of the present invention, the six address scheme for multiple hop forwarding in a wireless mesh network can pass frames to locations outside of the network. FIG. 6 depicts a node, STA 4 675, located outside of the wireless mesh network 600. STA 4 675 in this figure is a single node that is coupled to the external network 110 via a wired link. However, STA 4 675 could also represent another MPP linking the external network 110 to another wireless mesh network having multiple MPs, MAPs and STAs. A path 900 presenting the route of frame originating from STA1 685 and directed to STA 4 675 illustrates yet another feature of the present invention.

As the frame originates in STA1 685 it possesses information with respect to its destination embedded in the address scheme communicated to MAP1 680. The frame originating from STA1 685 uses a four address scheme with three fields applicable: address field one, address field two and address field three, since it is a frame from a STA to its associated AP. Field one 810 identifies MAP1 680 as the RA and field two 820 identifies STA1 685 as the TA. Field three 830 in this protocol identifies the end point destination STA 4 675. Using the same six field address scheme described with respect to FIG. 8 and path 800, as the frame arrives at MAP1 680, a six address scheme for multiple hop forwarding of frames is placed into effect. Previous field one 810, the RA is mapped to the TA in field two 820. The previous TA in field two 820, STA1 685, is recognized as the end point source and is mapped to field six 860. The previous end point destination residing in field three 830, STA 4 675, is mapped into field five 850 of the six address field scheme. The frame passes through multiple MPs as dictated by link quality, bandwidth and other factors known to one skilled in the art of wireless frame routing. Upon arriving at the MPP 620 the six fields of the address scheme indicate the RA, TA, DA and SA within the wireless mesh network and the end point destination and the end point source. As the frame transitions from the wireless mesh environment to the external network and ultimately to STA 4 675, only two address scheme are required. The end point destination of STA 4 675 is mapped to field one and, with respect to the wired infrastructure, the originating point, MPP 620, is mapped to field two.

The six field addressing scheme for multiple hop forwarding of frames in a wireless mesh network greatly simplifies the forwarding process. Recall that within the wireless mesh network, only fields one through four need to be processed. Frames five and six retain the end point information but need not be processed by each intermediate MP. The six address scheme also efficiently supports root-based HWMP proactive tree routing and RA-OLSR. HWMP proactive tree routing which is the default routing protocol in the 802.11 standard. RA-OLSR is an optional routing protocol in the 802.11 standard. The six field addressing scheme according to the present invention, also supports tunneling between portal communication.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

While there have been described above the principles of the present invention in conjunction with a six field address scheme, it is to be clearly understood that the foregoing description is made only by way of example and not as a limitation to the scope of the invention. Particularly, it is recognized that the teachings of the foregoing disclosure will suggest other modifications to those persons skilled in the relevant art. Such modifications may involve other features which are already known per se and which may be used instead of or in addition to features already described herein. Although claims have been formulated in this application to particular combinations of features, it should be understood that the scope of the disclosure herein also includes any novel feature or any novel combination of features disclosed either explicitly or implicitly or any generalization or modification thereof which would be apparent to persons skilled in the relevant art, whether or not such relates to the same invention as presently claimed in any claim and whether or not it mitigates any or all of the same technical problems as confronted by the present invention. The Applicant hereby reserves the right to formulate new claims to such features and/or combinations of such features during the prosecution of the present application or of any further application derived therefrom.

We claim:

1. In a wireless mesh network having a plurality of mesh points, a system for delivering a data frame between at least one beginning point and at least one endpoint, said system comprising: a processor configured to perform a six field address scheme facilitating forwarding of said data frame to said endpoint via a path through a plurality of intermediate mesh points, wherein said six field address scheme includes at least one field independently identifying said beginning point and at least one field independently identifying said endpoint, wherein said beginning point and/or said endpoint are outside the wireless mesh network and interfaces with the wireless mesh network via a beginning mesh point and an end mesh point, respectively, wherein the end mesh point acts as a mesh point collocated with a mesh portal and wherein the mesh point collocated with a mesh portal includes a proxy address table to convert an external address into proxy mesh point address and convert a legacy address scheme into said six field address scheme, wherein each of the plurality of intermediate mesh points includes a routing table, and the routing table only include the mesh points as the routing destination, and wherein each of the plurality of intermediate mesh points forward the frame based on said field identifying said endpoint and the routing table independent of a proxy address table.

2. The system of claim 1 wherein the beginning mesh point acts as a mesh access point and wherein the mesh access point includes a proxy address table to convert a legacy address scheme into the six field address scheme.

3. The system of claim 1 wherein the at least one end points include a plurality of mesh points communicating with each other via a root in a Hybrid Wireless Mesh Protocol proactive routing mode having a first path and a second path, the first path being from a source mesh point to a root and the second path being from the root to a destination mesh point.

4. The system of claim 3 wherein the root includes a proxy address table to convert an external address into a proxy mesh point address.

5. The system of claim 1, further comprising a mesh point portal.

6. A method of forwarding a data frame in a wireless mesh network having a plurality of mesh points wherein at least one mesh point is a mesh access point linking the wireless mesh network to a station outside of the wireless mesh network, said method comprising the steps of:
   at said mesh access point, receiving from the station said data frame directed to an endpoint wherein the data frame includes a first address scheme including a first address identifying the station as a beginning point of the data frame and a second address identifying the endpoint of the data frame;
   converting the first address scheme to a second address scheme wherein the second address scheme includes a plurality of address fields wherein the plurality of address fields is greater than the field of the first address scheme, and wherein at least one of the plurality of address fields of the second address scheme includes the first address identifying the beginning point of the data frame and wherein another one of the plurality of address fields of the second address scheme includes the second address identifying the endpoint of the data frame; and
   forwarding said data frame through the plurality of mesh points to the endpoint using, at each of the plurality of mesh points, only a routing table and information provided by the second address scheme.

7. The method of claim 6 wherein the at least one mesh point is collected with a mesh portal.

8. The method of claim 7 further comprising, at said at least one mesh point collocated with the mesh portal, receiving from an external network data frame directed to the endpoint wherein the data frame includes the first address identifying the station as a beginning point of the data frame and the second address identifying the endpoint of the data frame.

9. The method of claim 6 wherein said mesh access point includes a proxy address table for the wireless mesh network.

10. The method of claim 9 wherein converting occurs at said mesh access point using said proxy address table.

11. The method of claim 6 wherein at least one mesh point is a mesh portal point linking the wireless mesh network to a wired network.

12. The method of claim 11 wherein said mesh portal point includes a proxy address table.

13. The method of claim 6 wherein the endpoint is another station outside the wireless mesh network.

14. The method of claim 6 wherein of the plurality of mesh points, only said mesh access point(s) possesses a proxy address table.

15. A system for forwarding a data frame in a wireless mesh network wherein the wireless mesh network includes a plurality of mesh points, the system comprising: a processor configured to perform an address scheme having at least six fields wherein at least one field identifies an originating point of the data frame and another field identifies an endpoint of the data frame; and a routing table at each of the plurality of mesh points, wherein the data frame is forwarded to the endpoint using information contained within the address scheme and the routing table at each of the plurality of mesh points, wherein a subset of the plurality of mesh points are mesh access points, wherein each mesh access point includes a proxy address table, and wherein a four field address scheme is converted to the address scheme having at least six fields at the mesh access point using the proxy address table, wherein an end mesh point acts as a mesh point collocated with a mesh portal, wherein the routing table only include the mesh points as the routing destination, and wherein each of the plurality of intermediate mesh points forward the frame based on said field identifying said endpoint and the routing table independent of the proxy address table.

16. The system of claim 15 wherein the data frame is forwarded through mesh points subsequent to the mesh access point using only the address scheme and the routing table.

17. The system of claim 15 wherein a subset of the plurality of mesh points are mesh portal points and wherein each mesh portal point includes a proxy address table.

18. The system of claim 17 wherein a four field address scheme is converted to the address scheme having at least six fields at the mesh portal point using the proxy address table.

19. The system of claim 15 wherein the originating point is outside of the wireless mesh network.

20. The system of claim 15 wherein the endpoint is outside of the wireless mesh network.

21. The system of claim 15 wherein the routing table only includes mesh points as the routing destinations.

22. The system of claim 15 wherein a subset of the plurality of mesh points are roots and wherein each root includes a proxy address table.

23. The system of claim 15 wherein the data frame is forwarded from the originating point to the endpoint via a root mesh point according to Hybrid Wireless Mesh Protocol pro-active routing mode and wherein a first path and a second path are used, the first path being distinct from the second path.

24. The system of claim 23 wherein the first path begins at the originating point and ends at a root and the second path begins at the root and ends at the endpoint.

25. A method of forwarding a data frame in a wireless mesh network having a plurality of mesh points, wherein the plurality of mesh points include initiating mesh points, initiating proxy mesh points, mesh access points, end mesh points, and end proxy mesh points, and wherein the initiating mesh points and initiating proxy mesh points communicate with the end mesh points and the proxy end mesh points via two distinct mesh paths using in Hybrid Wireless Mesh Protocol proactive tree routing, said method comprising:
   receiving at said a mesh access point from a station said data frame directed to an endpoint wherein the data frame includes a first address scheme having four address fields wherein a second address field identifies the station as a beginning point of the data frame and a third address field identifies an endpoint of the data frame;
   converting the first address scheme to a second address scheme wherein the second address scheme includes six address fields and wherein at least one address field of the second address scheme includes address information identifying the beginning point of the data frame and wherein another one address field of the second address scheme includes address information identifying a root of the data frame;
   identifying at said root a proxy destination mesh point, and wherein at least one address field of the second address scheme includes address information identifying the endpoint of the data frame and wherein another one address field of the second address scheme includes address information identifying the proxy destination mesh point; and forwarding said data frame through the plurality of mesh points to the proxy destination mesh point using at each of the plurality of mesh points a routing table and information provided by the second address scheme.

26. The method of claim 25 wherein said root includes a proxy address table.

\* \* \* \* \*